Sept. 6, 1927. 1,641,672
G. GOEBEL ET AL
APPARATUS FOR ARRANGING AND FEEDING ARTICLES
Filed Nov. 27, 1923 3 Sheets-Sheet 3
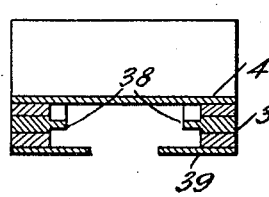
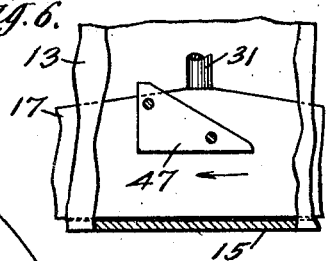
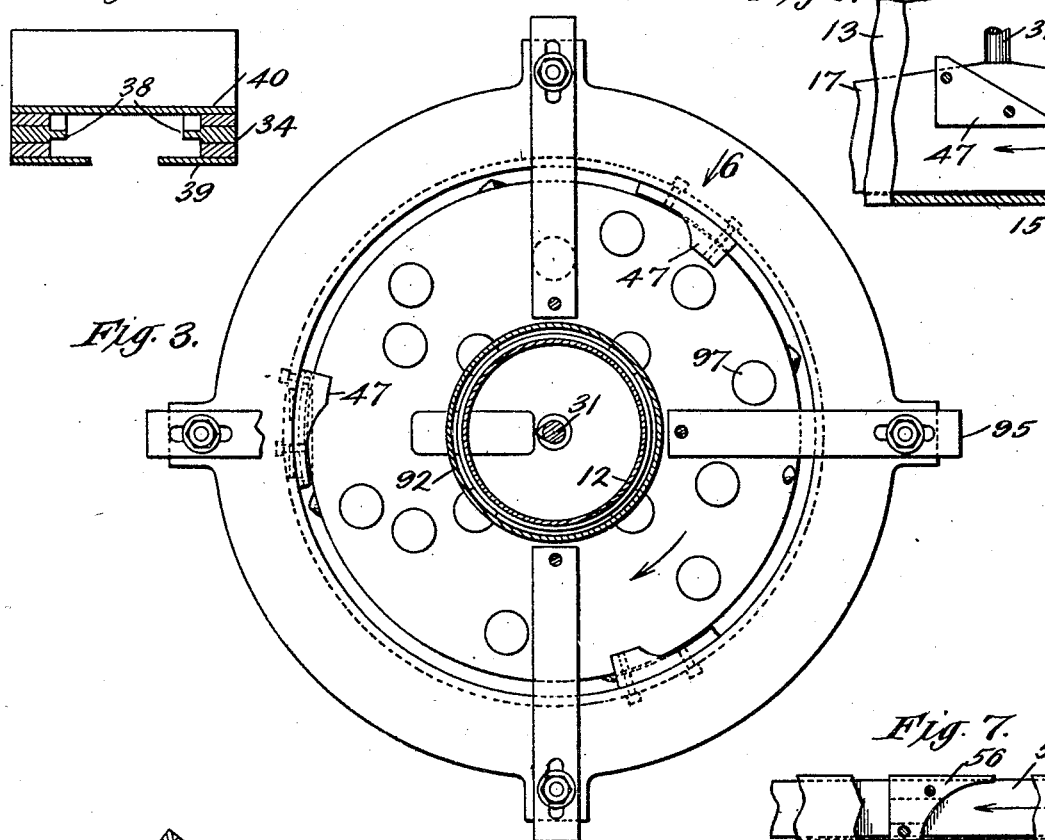
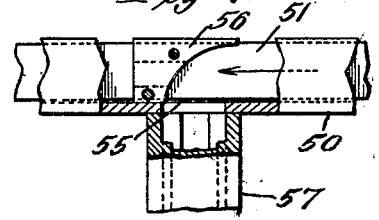
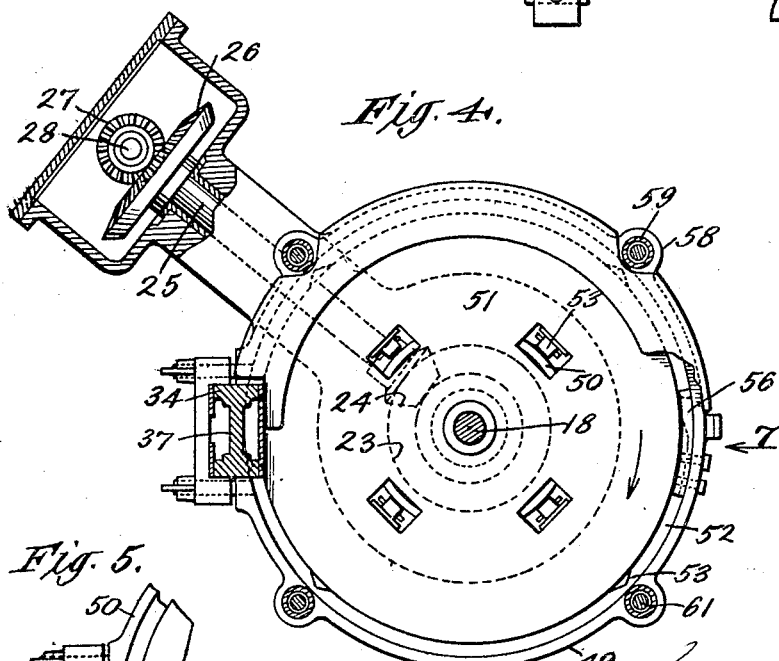
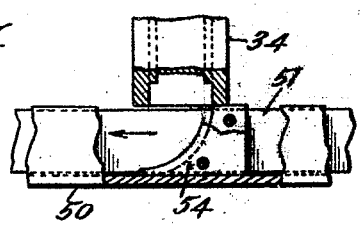
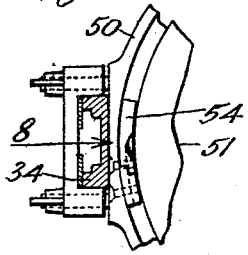

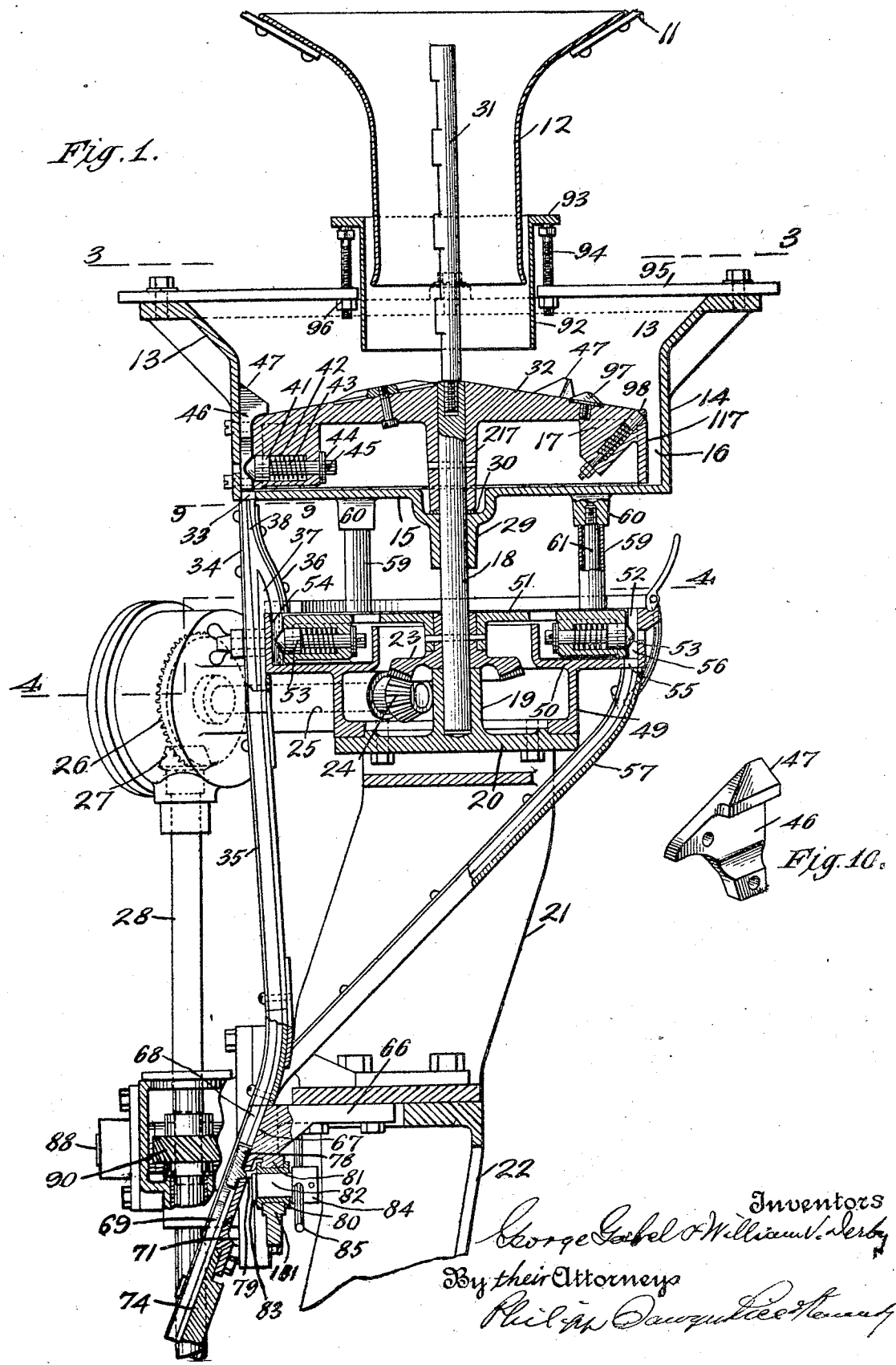

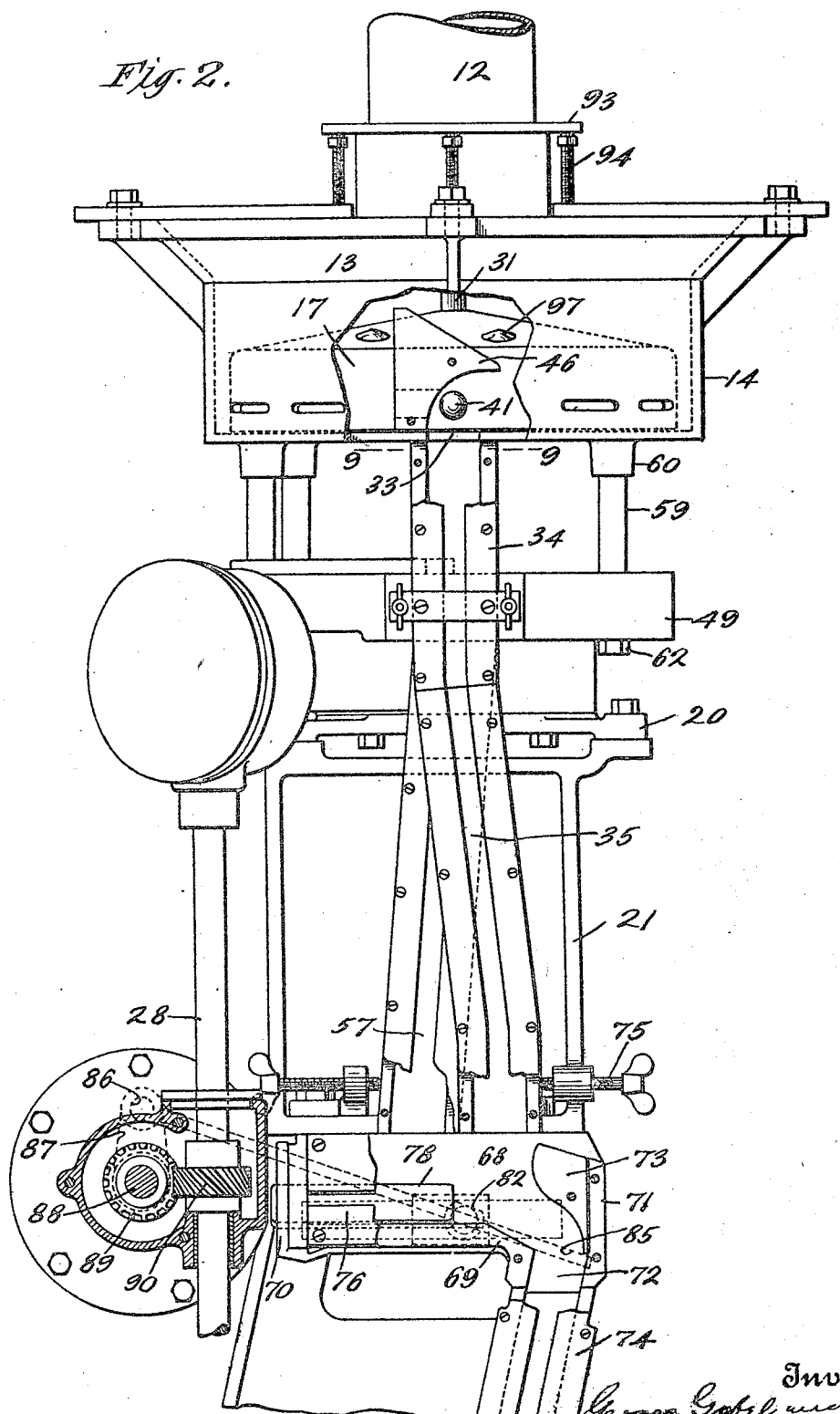

Patented Sept. 6, 1927.

1,641,672

UNITED STATES PATENT OFFICE.

GEORGE GOEBEL AND WILLIAM V. DERBY, OF BALTIMORE, MARYLAND, ASSIGNORS TO THE CROWN CORK AND SEAL COMPANY OF BALTIMORE CITY, OF BALTIMORE, MARYLAND, A CORPORATION OF MARYLAND.

APPARATUS FOR ARRANGING AND FEEDING ARTICLES.

Application filed November 27, 1923. Serial No. 677,235.

This invention relates to apparatus for arranging and feeding articles, and more particularly apparatus for arranging and feeding crowns and the like.

A crown cork, which is a bottle closure well known in the packaging art, comprises a metal crown shell having a corrugated skirt, and a sealing disc of cork or other material. In feeding complete crown corks to a capping machine or crown shells to an assembling machine for the insertion of the sealing disc, it is desirable to have the crowns properly and uniformly faced. According to one well known method of crown feed, a considerable mass of crowns is placed in a hopper and the mass of crowns is agitated to cause the crowns to be presented to selecting devices. Those crowns that are properly faced, and only such crowns, can pass the selecting devices and they are then delivered to the capping or assembling machine.

An objection to this method of crown selection and feed has been the scratching and other defacing of crown decorations which sometimes results from the constant agitation and churning of the mass. This is particularly so in the case of crown feeding to assembling machines because ordinarily the crown shells have but recently undergone the lithographing or other decorating treatment.

While the selection and feed of crowns to capping machines and to assembling machines have certain points in common, in the case of assembling machines a faster feed is desirable. An example of a crown assembling machine is shown in United States Patent No. 1,469,557 to George Goebel. The crown feed there shown is capable of a high rate of speed for the type of selection referred to, but the assembling machine is capable of a greater capacity.

It is the principal object of the present invention to provide an apparatus for arranging and feeding crowns or analogous articles from a disarranged mass into a row of individual articles uniformly faced, that is capable of high speed operation and that avoids mutilation or defacement of the articles or their decoration.

It is a further object of the invention to provide an apparatus for effectively individualizing articles from a disarranged mass that is capable of a variety of uses.

With these general objects in view the invention consists in the features, combinations, details of construction and arrangement of parts which will first be described in connection with the accompanying drawings and then more particularly pointed out.

In the drawings—

Figure 1 is a view in vertical section of an apparatus constructed in accordance with the invention;

Figure 2 is a view of the same in side elevation with parts in section and parts broken away;

Figure 3 is a sectional view taken on the line 3—3 of Fig. 1;

Figure 4 is a sectional view taken on the broken line 4—4 of Fig. 1;

Figure 5 is a detail sectional view taken just above the reversing dial;

Figure 6 is a detail face view looking in the direction of the arrow 6 in Fig. 3;

Figure 7 is a similar view with parts in section, looking in the direction of the arrow 7 of Fig. 4;

Figure 8 is a similar view looking in the direction of the arrow 8 of Fig. 5;

Figure 9 is a sectional view taken on the line 9—9 of Fig. 1; and,

Figure 10 is a detail perspective view of the cleaver and deflector shown in Figs. 1 and 2.

While the apparatus of the invention is adapted to the use of arranging disarranged masses of various articles, it is particularly adapted to arranging and feeding closures such, for example, as crowns. For convenience, therefore, it is here described in connection with crowns, but it is to be understood that the invention is not limited to such use.

Referring to the drawings, there is provided means for causing a disarranged mass of crowns to be arranged in a row of single crowns in edge-to-edge relation indiscriminately faced. This may be accomplished, for example, by delivering a mass of crowns to to a receptacle having a raceway designed to hold a row of single crowns and into which the crowns are caused to arrange themselves. Although capable of various constructions, in that here shown as an example, suspended from a main hopper or bin (not shown) by brackets 11 is a funnel-shaped spout 12. Below this spout, and supported as later described, is a cup-shaped receptacle 13 having an annular upright wall 14 and a flat bottom 15. Within this receptacle is a raceway 16 formed between the wall 14 of the receptacle and the peripheral wall 117 of a spreading dial 17. As appears in Fig. 1, the wall of the dial 17 is spaced from the wall of the receptacle a distance to permit crowns in single upright relation to enter the raceway. The dial 17 has a hub 217 which is pinned to a vertical shaft 18 having a lower bearing in a boss 19 formed on a plate 20. The plate 20 is bolted to a bracket 21 supported from a standard 22 which may, for example, extend upwardly from a crown assembling machine such as shown in the patent referred to.

To rotate shaft 18 and the dial, as here shown as an example, pinned to the shaft is a bevel gear 23 meshing with a pinion 24 on a cross shaft 25. The latter is rotated by a gear 26 meshing with a pinion 27 on a vertical drive shaft 28 to which power may be applied in any suitable manner. The bottom of the receptacle 13 has a boss 29 forming an upper bearing for shaft 18 and a support for a step bearing 30 for the hub 217 of dial 17.

The dial 17 has a top surface 32 which slopes downward toward the raceway 16, as is more clearly shown in Fig. 1, from a central point beneath the axis of the spout 12. Crowns in a mass being supplied to the spout 12 drop by gravity onto the top face of the dial 17. To aid in preventing jaming in the funnel a stirring rod 31 is secured to shaft 18 and extends up into the funnel, as appears in Fig. 1. The crowns dropping on the dial are spread outwardly and down the slope of the dial as the latter rotates, until they eventually tip down over the rounded edge of the dial into the raceway 16. This arranges the mass of crowns into a single row, but indiscriminately faced.

There is provided means for causing the single row of crowns to be divided into two rows according to the way they are faced. This may be accomplished, for example, by causing the crowns in the raceway 16 to be presented to selecting means associated with the receptacle. Although capable of various constructions, in that here shown as an example, in the bottom of the raceway is an opening 33 dimensioned to pass one crown at a time. Below the opening or passageway 33, for receiving the crowns therefrom, is a selecting chute 34 into which the crowns fall as they drop out of the raceway. Connecting with the selecting chute are a main feeding chute 35 and a branch chute 36, hereinafter referred to, the two being separated by a tapering partition 37. In the selecting chute 34 are two inwardly extending ribs 38 located substantially half way between the front 39 and back 40 of the chute, the ends being spaced sufficiently to pass the upper part of a crown. A crown received by the chute 34 from the raceway with its skirt faced outwardly from the dial, that is, toward the front of the chute, has its skirt received between ribs 38 and the front 39 of the chute and so passes into the main feeding chute 35. In the case of oppositely faced crowns, however, the skirts are received between the ribs 38 and the back 40 of the chute. This set of crowns, therefore, passes into the branch chute 36.

In order to cause the crowns in the raceway to travel around the same to the passageway 33, as here shown as an example, the dial has a plurality of crown-engaging plungers 41. These plungers are mounted in radial recesses 42 in the dial and are pressed outwardly by springs 43. This outward movement is limited by washers 44 and cotter pins 45, adjustment being obtained by supplying more or fewer washers 44. As appears in Fig. 1 the rounded ends of the plungers extend into the raceway and so into the path of the crowns. As the dial rotates, the plungers engage crowns and cause the row of crowns in the raceway to move around the latter to the passageway 33. The plungers can yield against their springs in case of a jam, whereby mutilation of crowns is avoided.

In order to prevent crowns in the raceway from being carried beyond the opening 33 and to aid in directing them into the opening, in the present exemplification there is a curved deflector block 46 set in the raceway just beyond the opening 33 in the direction of dial rotation. As each crown reaches the deflector 46 it is directed downwards into the opening 33 through which it drops by gravity into the selecting chute 34 above described. As appears in Figs. 1 and 10, the deflector block 46 is grooved to provide clearance for the plungers 41.

There is provided means for breaking up clusters of crowns adjacent the edge of the dial. As here shown as an example, secured to the inner wall 14 of the receptacle 13 are a number of cleavers 47. In the present embodiment there are three, equally spaced about the raceway, one being formed integral with the deflector 46 (Fig. 10). These cleavers extend across the raceway and have their upper parts formed to embrace the rounded upper edge of the dial. The cleavers are somewhat like plow-shares in form, the face rising in the direction of dial rotation. As the spreading mass of crowns rotates with the dial any tendency toward the formation of clusters of crowns is broken up by the cleavers 47.

As thus far described, the crowns have been taken from a mass and arranged in two rows of reversely faced crowns. That is, the crowns in chute 35 have their skirts facing to the left, as viewed in Fig. 1, those in chute 36 to the right.

There is provided means for reversing the direction of facing of the crowns in one row, whereby all the crowns will be uniformly faced. This may be accomplished, for example, by placing the crowns delivered by the selecting means to branch chute 36 in an annular raceway and causing them to be transported around half a circle. Although capable of various constructions, in that here illustrated as an example, bolted to plate 20 is a cylindrical bracket 49 supporting a trough-shaped, circular race element 50. Rotating within this race element is a dial 51 pinned to shaft 18. The outer face of the dial is spaced from the outer wall of race element 50 to form a raceway 52 similar to raceway 16—that is, one which accommodates crowns in single edge-to-edge relation. The dial 51 is provided with a number of spring-pressed plungers 53, that are duplicates of plungers 41 above described and are similarly mounted. The branch chute 36 terminates above the raceway 52 so that crowns in this chute drop by gravity into the raceway. Here the crowns are engaged by the spring-pressed plungers 53 and the row of crowns received is caused to travel around the raceway in the direction of the arrow in Fig. 4. To aid in readily effecting this crown movement, in the present embodiment set in the raceway 52 adjacent the rear of the chute 36, in the direction of dial rotation, is a curved guide block 54. The curved face of this guide block faces forwards, as appears in Fig. 8. Its face, at one end, joins the rear edge of the chute 36 and at the other end merges into the bottom of the raceway. That is, the guide block 54 serves to start the crowns forward in the raceway as they drop from the chute.

Diametrically located with respect to the end of chute 36, and in the bottom of the raceway 52, is a discharge opening 55 dimensioned to pass one crown at a time. As the crowns are successively carried around the raceway 52 to the opening 55, they drop through the opening and are thus discharged from the raceway. In order to prevent crowns from being carried beyond the discharge opening, set in the raceway, beyond the opening 55, in the direction of dial rotation, is a curved deflector block 56 (Fig. 7) which guides the crowns downwardly into the opening. Below the opening 55, in the present embodiment, is a supplemental feeding chute 57 for receiving the crowns discharged from the raceway 52. Inasmuch as the crowns in the raceway have been carried around 180° of a circle they now have a reversed facing. In other words, they are faced uniformly with those in main chute 35, namely, with skirts to the left as viewed in Fig. 1.

Referring to the manner of supporting the receptacle 13, as here shown as an example, the lower race element 50 has four bosses 58 (Fig. 4). Seated on these bosses are tubular spacers 59 on which are seated bosses 60 extending downwardly from the bottom of the receptacle 13. Studs 61 pass through the spacers and are threaded into the bosses 60, nuts 62, at their lower ends serving to tie together in spaced relation, the two elements, namely, the race forming receptacle 13 and the race forming element 50.

As far as thus described, the crowns in the mass have been arranged in two rows, all uniformly faced. There is provided means for combining the two rows of crowns into a single row. While this may be accomplished in various ways, it may conveniently be done by delivering the crowns, one or more at a time, to a magazine arranged to hold crowns in a horizontal row, this row being pushed out of the magazine into a delivery chute by a suitable pushing device. Although capable of various constructions, in that here illustrated, secured to standard 22 is a bracket 66 having a slanting front face 67 which forms the back of a magazine 68. Secured to the bracket 66 is a rib 69 which forms the bottom of the magazine on which the crowns rest. This rib 69 is turned upwardly, as at 70, to form one end of the magazine, the other end being formed by a rib 71 secured to bracket 66. At one end of the magazine (the right end as viewed in Fig. 2) the bottom rib 69 is turned downwardly to provide a discharge opening 72 for the crowns. Above this opening is a curved guide block 73 for deflecting the crowns into the opening. Registering with the opening 72, in the present embodiment, is a delivery chute 74, for conducting the crowns away from the magazine to an assembling or capping machine, for example. As appears in Fig. 1, the back or bottom plate of chute 74 is a continuation of the back face 67 of the magazine.

One set of crowns is delivered, in the present embodiment, directly from the selecting means to the magazine by chute 35, the other row via the reversing mechanism and the chute 57. To this end, as here shown, chute 35 extends downwardly and slightly to one side (Fig. 2) terminating adjacent the open top of magazine 68. Chute 57 curves and slants forwardly toward chute 35 (Fig. 1) and slightly to one side (Fig. 2) and terminates adjacent the top of the magazine alongside chute 35. The chute ends are adjustably held in place by set screws 75.

As appears in Fig. 1, the back face 67 of the magazine forms a continuation of the back or bottom walls of chutes 35 and 57. Crowns in both chutes, therefore, slide from the chutes down the surface 67 and are received by the bottom rib 69 on which they rest in upright, edge-to-edge relation.

The magazine has cover plates 76 spaced apart to permit inspection.

There is provided a pusher for pushing crowns in the magazine to the exit opening whereby the crowns are discharged into the delivery chute 74. In the present embodiment, reciprocated through the magazine just above the bottom rib 69, is a pusher 78 in the form of a long flat bar of a thickness to substantially fill the space between the front and back plates of the magazine. This pusher is supported by means of an integral arm 79 from a slide block 80, the arm 79 passing through a suitable slot formed in the wall 67 and the pusher working in an opening in the end portion 70 of the rib 69. The top and bottom of the slide block are channeled as shown in Fig. 1. The top slides on a lug or track 81 formed on the bracket 66 and the bottom slides on a track 181 suspended from bracket 66. The pusher is reciprocated back and forth through the magazine by the movement of the slide block 80. To reciprocate the slide block, as here shown, inserted in the slide block is a tubular connecting element 82 held in place by a flange 83 and a collar 84, the collar being pinned to element 82. Passing through the collar 84 and element 82 is a driving rod 85. This driving rod has a slip-friction connection with the element 82, such as is disclosed in United States Patent No. 1,469,556 which describes and claims certain features of the mechanism being described. This driving rod is mounted on the pin 86 of a crank 87 which is driven by a shaft 88 rotated through intermeshing gears 89, 90 from shaft 28. Under normal conditions, as the connecting rod reciprocates, the friction connection with element 82 causes the slide block 80 to move with the connecting rod thus reciprocating the pusher in the magazine. In case, however, the pusher encounters an excessive resistance, as in the case of a jam of crowns, the friction is overcome thus permitting the connection to slip without moving the slide block. During withdrawal of the pusher crowns singly or simultaneously can drop into the magazine from the two chutes. As the pusher advances through the magazine, the row of crowns received by the latter is pushed toward the end thereof, each crown being successively directed downward to the exit opening, through which it drops into chute 74. The construction described provides an effective and rapidly operating means for taking two rows of crowns and combining them into one row.

Referring back to the spreading dial above described, there is provided means for regulating the amount of crowns supplied to the dial. This may be accomplished, for example, by a yieldably mounted adjustable spout extension which acts as a gate valve. Although capable of various constructions, in the present embodiment, telescoping the lower part of the spout 12, is an extension sleeve 92 having an external flange 93 at its top. This flange is freely suspended on the tops of a plurality of bolts 94 threaded through radial arms 95 extending inwardly from the upper rim of the receptacle 13. By adjusting the position of the bolts 94 the sleeve may be caused to extend more or less into the space below the spout 12, thus acting, in effect, as an adjustable gate valve to regulate the amount of crowns that can pass out from the spout. The bolts 94 are held in adjusted position by lock nuts 96. With the construction described, the crowns falling from the spout pass out beneath the spout extension 92. If the extension is lowered fewer crowns can pass out; if it is raised, more crowns can pass. The sleeve 92 being freely suspended to float on bolts 94, can yield against the pressure of a jam of crowns, whereby crown mutilation is avoided.

To aid in the spreading movement of the crowns, there is provided means for preventing crowns from stacking up in unspread clusters on the dial. As here shown as an example, on the face of the dial are a number of buttons or agitators 97 arranged in staggered and irregular spacing (Figs. 1 and 3). These buttons prevent any tendency of the crowns to stack up on the dial and insure a spreading movement. A spring-pressed yieldable plunger 98 extending outwardly from the corner of the dial aids in preventing clusters and jamming.

While the operation of the apparatus will be clear from the above description, to review the main features thereof, crowns or other articles in a disarranged mass are deposited in the receptacle 13 on the top of the spreading dial 17 through spout 12. As the dial rotates, due to its form and movement, the crowns slide out and down the conical top face and tip over the rounded rim of the dial into raceway 16. Clusters are broken up by cleavers 47 and buttons 97 aid in effecting a thorough spreading action. Thus the crowns are arranged individually in a row in upright edge-to-edge relation but are still indiscriminately faced. As the dial rotates, the crowns are moved by plungers 41 around the raceway to the opening 33 into which they are directed by deflector 46 and through which they drop one by one, into the selecting chute 34. Here they are divided into two rows according to the way they are faced, as above described in detail. One set passes by gravity down chute 35 directly to the magazine 68. The other set drops through chute 36 into the raceway 52, each crown as it leaves the chute being directed forwardly my the deflector 54. As the reversing dial 51 rotates, the crowns are moved around an arc 180° to the opening 55, which movement reverses their direction of facing. Directed by deflector 56, the reversed crowns drop through opening 55 into chute 57, which conducts them by gravity to the magazine 68.

The magazine thus receives two rows of crowns which are received by the rib 69. As pusher 78 advances, the crowns in the magazine are pushed one by one to opening 72 through which they drop into chute 74.

This chute, therefore, contains a single row of individual crowns all uniformly faced and may conduct them as desired, for example, to an assembling or capping machine.

What we claim is:

1. In an apparatus for arranging and feeding articles such, for example, as crowns, and in combination, a receptacle for receiving a disarranged mass of the articles, selecting means associated with the receptacle for dividing the articles into two sets according to the way they are faced, means for causing the articles in the mass to be presented individually to said selecting means, a magazine for receiving a horizontal row of articles in upright edge-to-edge relation, a chute leading away from said magazine, means for conducting one set of articles from the selecting means to the magazine, means for reversing the direction of facing of the other set and conducting the same to the magazine, and means for pushing the articles in the magazine into said chute.

2. In combination, a receptacle enclosing a raceway for receiving articles having unequal breadth and thickness in single edge-to-edge relation, a spreading element for causing the articles deposited thereon in a disarranged mass to be arranged individually in the raceway, a spout above the spreading element for delivering the articles thereto in a mass, said spout being adjustable to control the rate of article delivery.

3. In combination, a receptacle enclosing a raceway for receiving articles having unequal breadth and thickness in single edge-to-edge relation, a spreading element for causing the articles deposited thereon in a disarranged mass to be arranged individually in the raceway, a spout above the spreading element for delivering the articles thereto in a mass, and a gate valve forming a continuation of the spout and adjustable toward and away from the spreading element to control the rate of article feed.

4. In combination, a receptacle enclosing a raceway for receiving articles having unequal breadth and thickness in single edge-to-edge relation, a spreading element for causing the articles deposited thereon in a disarranged mass to be arranged individually in the raceway, a spout above the spreading element for delivering the articles thereto in a mass, and a floating spout extension.

5. In combination, a receptacle enclosing a raceway for receiving articles having unequal breadth and thickness in single edge-to-edge relation, a spreading element for causing the articles deposited thereon in a disarranged mass to be arranged individually in the raceway, a spout above the spreading element for delivering the articles thereto in a mass, and a spout extension freely suspended on adjustably mounted bolts, whereby the extension floats and is adjustable to serve as a gate valve to contral the rate of article feed.

6. In combination, a receptacle having an annular upright wall, a spreading dial rotatably mounted within said wall and having an annular wall spaced from said receptacle wall to form therewith a raceway for receiving articles having unequal breadth and thickness in single edge-to-edge relation, said dial having a substantially conical top face, whereby articles deposited thereon in a disarranged mass can slide outwardly and arrange themselves on edge in said raceway, said raceway having an exit opening for the discharge of the articles, a yieldably mounted plunger carried by said dial and having its outer end extending into said raceway to engage the articles therein and cause them to be moved to the exit opening, and means for rotating the dial.

7. In combination, a receptacle having an annular upright wall, a spreading dial rotatably mounted within said wall and having an annular wall spaced from said receptacle wall to form therewith a raceway for receiving articles having unequal breadth and thickness in single edge-to-edge relation, said dial having a substantially conical top face, whereby articles deposited thereon in a disarranged mass can slide outwardly and arrange themselves on edge in said raceway, a spout above said dial for delivering the articles thereto in a mass, a plurality of buttons on the top face of the dial for aiding a thorough spreading action, and means for rotating the dial.

8. In an apparatus for arranging and feeding articles such, for example, as crowns, and in combination, a receptacle having an annular upright wall, a rotatable spreading dial having an annular wall spaced from said receptacle wall to form a raceway for receiving the articles in single edge-to-edge relation, means for rotating the dial, and a cleaver associated with the top of the raceway for breaking up clusters of the articles.

9. In an apparatus for arranging and feeding articles such, for example, as crowns, and in combination, a receptacle having an annular upright wall, a rotatable spreading dial having an annular wall spaced from said receptacle wall to form a raceway for receiving the articles in single edge-to-edge relation, means for rotating the dial, and a plurality of plow-share shaped cleavers secured to the receptacle adjacent the raceway and having faces rising in the direction of dial rotation, for breaking up clusters of the articles.

10. In combination, a receptacle having an annular upright wall, a rotatable spreading dial having an annular wall spaced from said receptacle wall to form a raceway for receiving the articles having unequal breadth and thickness in single edge-to-edge relation, said raceway having an exit opening on the bottom thereof for the individual discharge of the articles, means associated with the dial for causing the articles in the raceway to be moved around to said opening, and a deflecting guide block set in the raceway beyond the opening in the direction of dial rotation for directing the articles into said opening.

11. In an apparatus for arranging and feeding articles such, for example, as crowns, and in combination, means for causing a disarranged mass of the articles to be individually arranged in a row in edge-to-edge relation indiscriminately faced, selecting means for dividing the articles into two rows according to the way they are faced, means for causing the articles in the first named row to be presented to said selecting means, a reversing dial, a race element forming with said dial, a raceway for receiving the articles in single edge-to-edge relation, a chute leading from said selecting means to the top of the raceway for conducting one of the divided rows of articles thereto, means for rotating said reversing dial, and a deflecting guide block set in the raceway for directing the articles, dropping from said chute, forward in the direction of dial rotation.

12. In an apparatus for arranging and feeding articles such, for example, as crowns, and in combination, a raceway for receiving the articles in single edge-to-edge relation, a rotary dial, means associated therewith for causing movement of the articles around the raceway, a chute registering with the top of the raceway, whereby the articles may drop into the latter, and a deflecting guide block set in the raceway to the rear of the chute with relation to the direction of dial rotation, said guide block having a curved front face which forms a continuation of the rear wall of the chute, curves forwardly, and merges into the bottom of the raceway.

13. In an apparatus for arranging and feeding articles such, for example, as crowns, and in combination, means for causing a disarranged mass of the articles to be arranged in a row in single edge-to-edge relation, indiscriminately faced, selecting means for dividing the articles in two rows according to the way they are faced, means for causing the articles in the raceway to be individually presented to said selecting means, a chute for conducting away one set of articles from the selecting means, a race element, a rotary dial forming, with the race element, a raceway for receiving the articles in single edge-to-edge relation, means associated with said dial for causing the articles to be moved around the raceway, said chute terminating at the top of the raceway, whereby the articles may be delivered thereto from the selecting means, said raceway having an exit opening therein at a point diametrically opposite said chute, whereby the articles transported from the receiving chute to the exit opening have their direction of facing reversed.

14. In an apparatus for arranging and feeding articles such, for example, as crowns, and in combination, means for causing a disarranged mass of the articles to be arranged in a row in single edge-to-edge relation, indiscriminately faced, selecting means for dividing the articles in two rows according to the way they are faced, means for causing the articles in the raceway to be individually presented to said selecting means, a chute for conducting away one set of articles from the selecting means, a race element, a rotary dial forming, with the race element, a raceway for receiving the articles in single edge-to-edge relation, means associated with said dial for causing the articles to be moved around the raceway, said chute terminating at the top of the raceway, whereby the articles may be delivered thereto from the selecting means, said raceway having an exit opening therein at a point diametrically opposite said chute, whereby the articles transported from the receiving chute to the exit opening have their direction of facing reversed, a magazine for receiving a horizontal row of articles in single edge-to-edge relation, said magazine having a discharge opening adjacent one end thereof, a chute for conducting the reversed set of articles from the raceway opening to said magazine, a chute for conducting the other set of articles from the selecting means to the magazine, and a pusher for pushing the articles in the magazine to said discharge opening.

15. In an apparatus for arranging and feeding articles such, for example, as crowns, and in combination, a magazine for receiving a horizontal row of articles in single edge-to-edge relation, a plurality of chutes for conducting the articles in rows to the magazine, a delivery chute leading away from one end of the magazine, and a pusher for pushing the articles in the magazine into said delivery chute, whereby the several rows of articles are combined into one row.

16. In an apparatus for arranging and feeding articles such, for example, as crowns, and in combination, a raceway for receiving the articles in single edge-to-edge relation, means for causing a disarranged mass of the articles to be individually arranged in said raceway indiscriminately faced, said raceway having an exit opening in the bottom thereof through which the articles drop by gravity, selecting means below the exit opening for receiving the articles and dividing them into two rows according to the way they are faced, gravity feed chutes for conducting the two sets of articles away from the selecting means, means for reversing the direction of facing of one set, to which means the articles are conducted by one of said chutes, and a gravity feed chute for conducting away the reversed articles from said reversing means.

17. In an apparatus for arranging and feeding articles such, for example, as crowns, and in combination, a receptacle having an annular upright wall, a rotatable spreading dial having an annular wall spaced from said receptacle wall to form a raceway for receiving the articles in single upright edge-to-edge relation, said dial having a substantially conical top face down which a disarranged mass of articles may slide to take such relation in the raceway, said raceway having an exit opening in the bottom thereof, means for causing the articles to be presented to said exit opening one by one to be discharged therethrough, selecting means for receiving the discharged articles and dividing them into two sets according to the way they are faced, a gravity feed chute for conveying one set of articles away from the selecting means, a second gravity feed chute for conveying the other set of articles away from the selecting means, a reversing dial, an annular race element forming, with said dial, an annular raceway for receiving the articles in single upright edge-to-edge relation, said second chute leading to the top of said last-named raceway, whereby the articles pass by gravity from the chute into the raceway, the last-named raceway having a discharge opening in the bottom thereof located diametrically opposite the discharge end of the second chute, means for rotating the reversing dial to carry the articles around to said last-named discharge opening, and a gravity feed chute, for conveying the articles away from said last-named discharge openings.

In testimony whereof, we have hereunto set our hands.

GEORGE GOEBEL.
WILLIAM V. DERBY.